US010200805B2

(12) United States Patent
Lehtiniemi et al.

(10) Patent No.: US 10,200,805 B2
(45) Date of Patent: Feb. 5, 2019

(54) CHANGING SPATIAL AUDIO FIELDS

(71) Applicant: Nokia Technologies Oy, Espoo (FI)

(72) Inventors: Arto Lehtiniemi, Lempäälä (FI); Antti Eronen, Tampere (FI); Jussi Leppänen, Tampere (FI); Juha Arrasvuori, Tampere (FI)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 15/785,729

(22) Filed: Oct. 17, 2017

(65) Prior Publication Data
US 2018/0115853 A1    Apr. 26, 2018

(30) Foreign Application Priority Data

Oct. 20, 2016   (EP) .................................... 16194777

(51) Int. Cl.
*H04S 7/00* (2006.01)
*H04S 3/00* (2006.01)
*G06F 3/16* (2006.01)

(52) U.S. Cl.
CPC .............. *H04S 7/303* (2013.01); *G06F 3/165* (2013.01); *G06F 3/167* (2013.01); *H04S 3/008* (2013.01); *H04S 2400/01* (2013.01); *H04S 2400/11* (2013.01)

(58) Field of Classification Search
None
See application file for complete search history.

(56) References Cited

U.S. PATENT DOCUMENTS 9,282,399 B2 * 3/2016 Kim ....................... H04R 1/326
2009/0286600 A1 11/2009 Hideya
2012/0262536 A1 10/2012 Chen et al.
(Continued)

FOREIGN PATENT DOCUMENTS

| EP | 1227392 A2 | 7/2002 |
| EP | 3255905 A1 | 12/2017 |
| WO | 2014/162171 A1 | 10/2014 |

OTHER PUBLICATIONS

"Panning (audio)", Wikipedia, Retrieved on Dec. 27, 2017, Webpage available at : https://en.wikipedia.org/wiki/Panning_(audio).
(Continued)

*Primary Examiner* — Paul Huber
(74) *Attorney, Agent, or Firm* — Mintz Levin Cohn Ferris Glovsky and Popeo, P.C.

(57) ABSTRACT

Embodiments herein relate generally to changing spatial audio fields that are defined for audio sources. In the embodiments, the spatial audio fields are indicated to a user performing audio mixing, for instance by displaying them as polygons on a touch screen. The spatial audio fields move as the related audio sources move, and/or as the position of a notional consumer changes. Apparatus of the embodiments is configured to detect whether at any time (initially, or after movement) there is overlapping of two spatial audio fields. If an overlap is detected, this is indicated to a user performing audio mixing The apparatus then responds to a user input (e.g. a gesture on the touch screen) by detecting the nature of the user input and then moving or sizing one or both of overlapping spatial audio fields and such that overlapping is avoided or reduced.

11 Claims, 11 Drawing Sheets

(56) References Cited

U.S. PATENT DOCUMENTS

| | | | |
|---|---|---|---|
| 2013/0094672 A1 | 4/2013 | Liang | |
| 2013/0342731 A1* | 12/2013 | Lee | H04N 5/23293 348/231.4 |
| 2014/0379108 A1 | 12/2014 | Vesa et al. | |
| 2015/0281833 A1* | 10/2015 | Shigenaga | H04R 3/005 381/92 |

OTHER PUBLICATIONS

Pihlajamaki et al., "Synthesis of Spatially Extended Virtual Source with Time-Frequency Decomposition of Mono Signals", J. Audio Eng. Soc., vol. 62, No. 7/8, Jul./Aug. 2014, pp. 467-484.

Shah et al., "Metrics for Measuring Ideation Effectiveness", Design Studies, vol. 24, No. 2, Mar. 2003, pp. 111-134.

Smith, "Idea-Generation Techniques: A Formulary of Active Ingredients", journal of Creative Behavior, vol. 32, No. 2, Jun. 1998, pp. 107-133.

Smith, "Towards a Logic of Innovation", The International Handbook on Innovation, 2003, pp. 347-365.

"Controlling 3D Sound Using Natural Gesture", BBC, Retrieved on Dec. 19, 2017, Webpage available at : http://www.bbc.co.uk/blogs/researchanddevelopment/2011/12/controlling-3d-sound-using-ges.shtml.

Schacher, "Gesture Control of Sounds in 3D Space", Proceedings of the 7th international conference on New interfaces for musical expression, Jun. 6-10, 2007, pp. 358-362.

Odowichuk et al., "Controlling Real Time Sound Spatialization Using the Radiodrum", Proceedings of the International Computer Music Conference, Jul. 31-Aug. 5, 2011, pp. 9-12.

Extended European Search Report received for corresponding European Patent Application No. 16195060.5, dated Apr. 6, 2017, 6 pages.

Extended European Search Report received for corresponding European Patent Application No. 16194777.5, dated May 18, 2017, 6 pages.

* cited by examiner

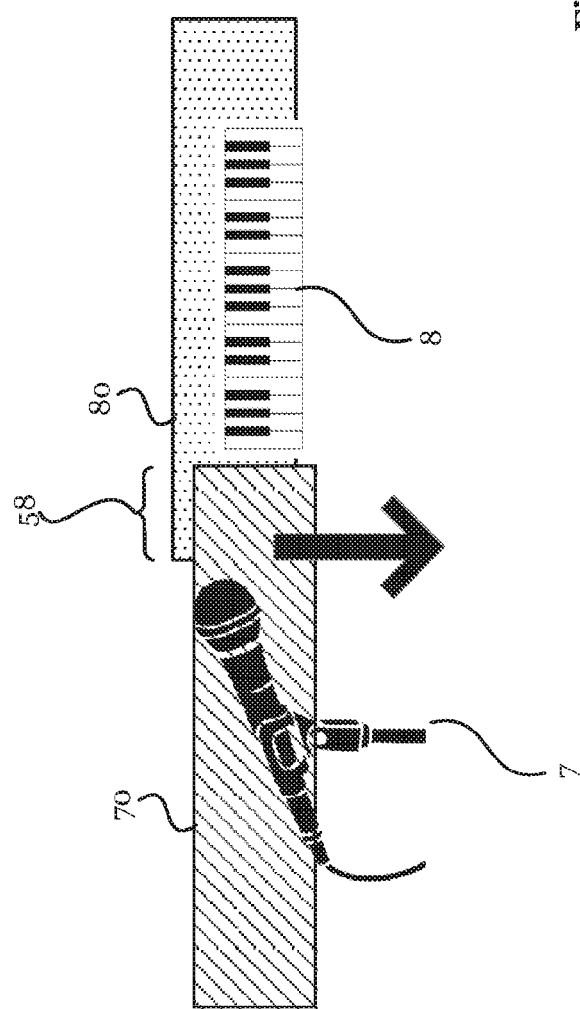
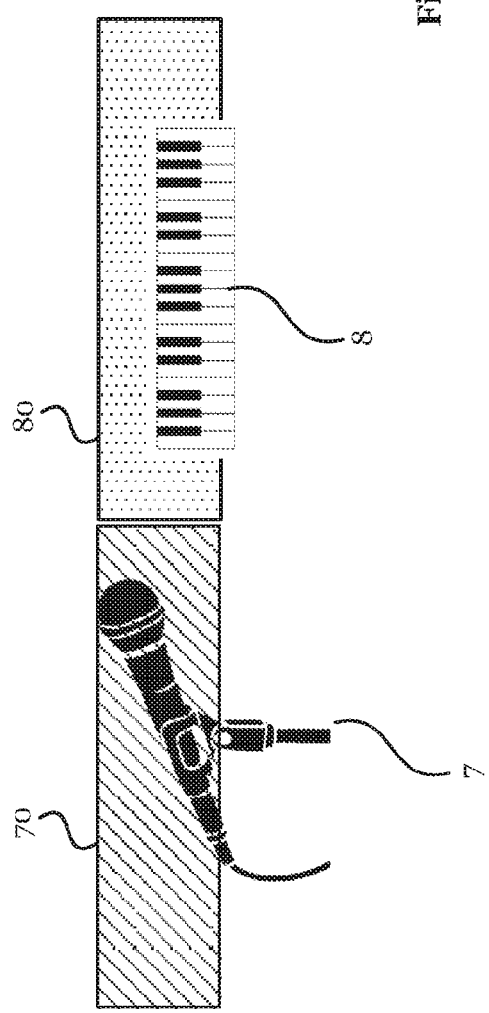

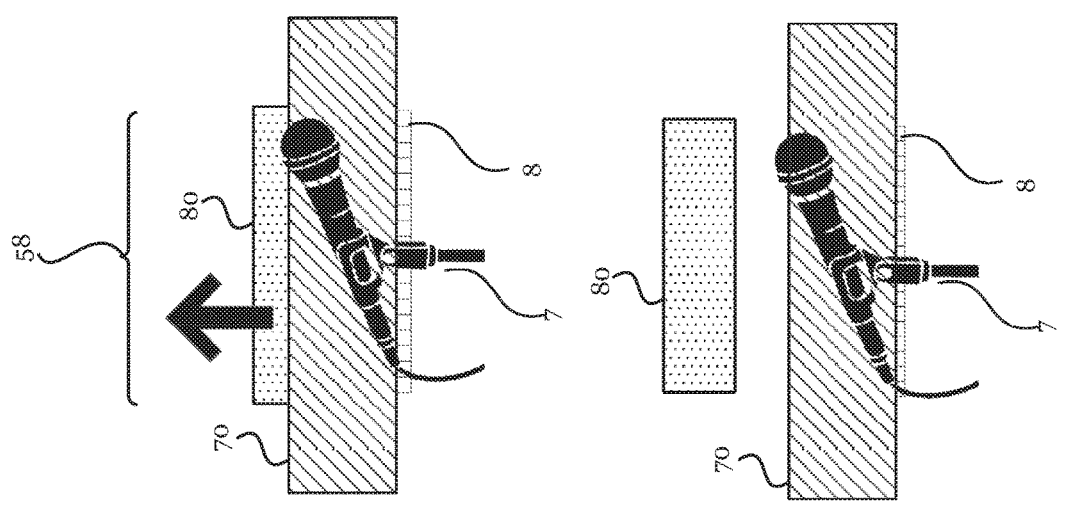

CHANGING SPATIAL AUDIO FIELDS

FIELD

This specification relates generally to methods and apparatuses for changing spatial audio fields.

BACKGROUND

Spatial audio refers to playable audio data that exploits sound localisation. In a real world space, for example in a concert hall, there will be multiple audio sources, for example the different members of an orchestra or band, located at different locations on the stage. The location and movement of the sound sources is a parameter of the captured audio. In rendering the audio as spatial audio for playback, such parameters are incorporated in the data using processing algorithms so that the listener is provided with an immersive and spatially oriented experience.

It is known to process audio captured via a microphone array into spatial audio; that is audio with a spatial percept. The intention is to capture audio so that when it is rendered to a user the user will experience the sound field as if they are present at the location of the capture device.

An example application of spatial audio is in virtual reality (VR) whereby both video and audio data is captured within a real world space. In the rendered version of the space, i.e. the virtual space, the user, through a VR headset, may view and listen to the captured video and audio which has a spatial percept.

SUMMARY

According to a first aspect of the present invention, there is provided a method comprising:
  receiving at least first and second audio signals representing audio respectively from first and second audio sources in a space;
  defining for the first and second audio sources first and second spatial audio fields, respectively, each being indicative of the propagation of the respective audio signals within the space;
  detecting at least partial overlapping of the first spatial audio field at least with the second spatial audio field in an overlap region;
  causing an indication of the at least partial overlapping to a user; and
  responding to a user input by moving or re-sizing one or both of the first spatial audio field and the second spatial audio field.

The method may comprise responding to the user input by reducing a size of one or both of the first spatial audio field and the second spatial audio field.

The method may comprise responding to the user input by moving one or both of the first spatial audio field and the second spatial audio field in a horizontal direction. Alternatively, the method may comprise responding to the user input by moving one or both of the first spatial audio field and the second spatial audio field in a vertical direction.

The method may comprise responding to the user input by placing the first spatial audio field and the second spatial audio field adjacent to one another in a horizontal direction. Alternatively, the method may comprise responding to the user input by placing the first spatial audio field and the second spatial audio field adjacent to one another in a vertical direction.

The method may comprise responding to the user input by splitting the first spatial audio field into two portions and placing them either side of the second spatial audio field.

The method may comprise responding to the user input by moving or re-sizing the first spatial audio field but not the second spatial audio field.

The method may comprise responding to the user input by moving a rearmost one of the first and second audio fields to a frontmost position.

The method may comprise causing an indication of the at least partial overlapping to a user by changing a visual representation of the overlap region.

The method may comprise causing an indication of the at least partial overlapping to a user by causing a visual representation of the overlap region to change in an alternating manner.

The at least first and second audio signals may represent live audio and the detecting and the causing an indication may be performed in real time.

Another aspect provides apparatus configured to perform any of the above methods.

A further aspect provides a computer program comprising instructions that when executed by computing apparatus causes it to perform any of the above methods.

Apparatus comprising:
  at least one processor;
  at least one memory having computer-readable instructions stored thereon, the computer-readable instructions when executed by the at least one processor causing the apparatus to perform:
    receiving at least first and second audio signals representing audio respectively from first and second audio sources in a space;
    defining for the first and second audio sources first and second spatial audio fields, respectively, each being indicative of the propagation of the respective audio signals within the space;
    detecting at least partial overlapping of the first spatial audio field at least with the second spatial audio field in an overlap region;
    causing an indication of the at least partial overlapping to a user; and
    responding to a user input by moving or re-sizing one or both of the first spatial audio field and the second spatial audio field.

The computer-readable instructions when executed by the at least one processor may cause the apparatus to perform reducing a size of one or both of the first spatial audio field and the second spatial audio field.

The computer-readable instructions when executed by the at least one processor may cause the apparatus to perform responding to the user input by moving one or both of the first spatial audio field and the second spatial audio field in a horizontal direction.

The computer-readable instructions when executed by the at least one processor may cause the apparatus to perform responding to the user input by moving one or both of the first spatial audio field and the second spatial audio field in a vertical direction.

The computer-readable instructions when executed by the at least one processor may cause the apparatus to perform responding to the user input by placing the first spatial audio field and the second spatial audio field adjacent to one another in a horizontal direction.

The computer-readable instructions when executed by the at least one processor may cause the apparatus to perform responding to the user input by placing the first spatial audio field and the second spatial audio field adjacent to one another in a vertical direction.

The computer-readable instructions when executed by the at least one processor may cause the apparatus to perform responding to the user input by splitting the first spatial audio field into two portions and placing them either side of the second spatial audio field.

The computer-readable instructions when executed by the at least one processor may cause the apparatus to perform responding to the user input by moving or re-sizing the first spatial audio field but not the second spatial audio field.

The computer-readable instructions when executed by the at least one processor may cause the apparatus to perform responding to the user input by moving a rearmost one of the first and second audio fields to a frontmost position.

The computer-readable instructions when executed by the at least one processor may cause the apparatus to perform causing an indication of the at least partial overlapping to a user by changing a visual representation of the overlap region.

The computer-readable instructions when executed by the at least one processor may cause the apparatus to perform causing an indication of the at least partial overlapping to a user by causing a visual representation of the overlap region to change in an alternating manner.

The at least first and second audio signals may represent live audio and the computer-readable instructions when executed by the at least one processor may cause the apparatus to perform the detecting and the causing an indication in real time.

Another aspect provides a computer-readable medium having computer-readable code stored thereon, the computer-readable code, when executed by at least one processor, cause performance of:

receiving at least first and second audio signals representing audio respectively from first and second audio sources in a space;

defining for the first and second audio sources first and second spatial audio fields, respectively, each being indicative of the propagation of the respective audio signals within the space;

detecting at least partial overlapping of the first spatial audio field at least with the second spatial audio field in an overlap region;

causing an indication of the at least partial overlapping to a user; and responding to a user input by moving or re-sizing one or both of the first spatial audio field and the second spatial audio field.

BRIEF DESCRIPTION OF THE DRAWINGS

Embodiments will now be described, by way of non-limiting example, with reference to the accompanying drawings, in which:

FIGS. 6a and 6b are system diagrams showing how partially overlapping spatial audio fields are separated according to embodiments;

FIGS. 9a and 9b are system diagrams showing how fully overlapping spatial audio fields are separated according to embodiments;

DETAILED DESCRIPTION OF EMBODIMENTS

Embodiments herein relate generally to changing spatial audio fields that are defined for audio sources. In the embodiments, the spatial audio fields are indicated to a user performing audio mixing, for instance by displaying them as polygons on a touch-screen.

The spatial audio fields move as the related audio sources move, and/or as the position of a notional consumer changes. Apparatus of the embodiments is configured to detect whether at any time (initially, or after movement) there is overlapping of two spatial audio fields. If an overlap is detected, this is indicated to a user performing audio mixing. indicating can be done through changing display parameters of the polygon representations. The apparatus then responds to a user input (e.g. a gesture on the touch screen) by detecting the nature of the user input and then moving or sizing one or both of overlapping spatial audio fields and such that overlapping is avoided or reduced. The embodiments avoid or ameliorate the situation where sound from overlapping spatial audio fields may appear distorted from the perspective of the user or one sound source may be masked entirely.

The embodiments described herein allow a user (such as a mixing operator) to move or change the shape of otherwise overlapping spatial audio fields in a VR environment. For example, an overlapping spatial audio field may be cropped so that no overlapped spatial audio field is present in resulting mixed audio. This may be achieved 'live' as the content is captured, for live consumption or for consumption later.

An example application is in a VR capture and rendering system in which video is also captured and rendered to provide an immersive user experience. Nokia's OZO® VR camera is used as an example of a VR capture device which comprises a microphone array to provide a spatial audio signal, but it will be appreciated that the embodiments are not limited to VR applications nor the use of microphone arrays at the video capture point. Local microphones (e.g. Lavalier microphones) or instrument pickups may be employed, for example.

Figure 1:
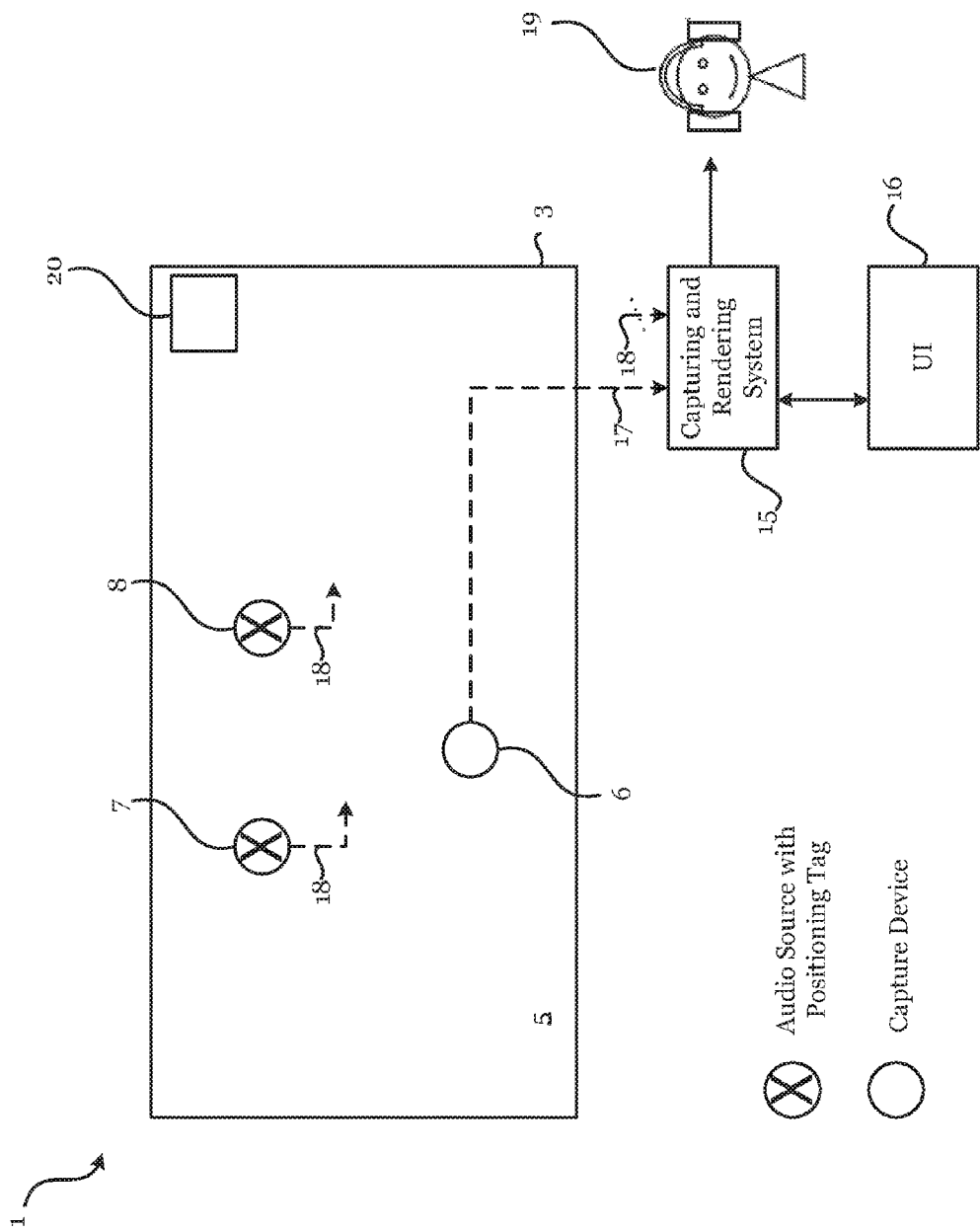
FIG. 1 is a schematic representation of a distributed audio capture scenario, including use of a rendering apparatus according to embodiments.

Referring to FIG. 1, an overview of a VR capture scenario 1 is shown together with a capture, mixing and rendering system (CRS) 15 with an associated user interface 16. The Figure shows in plan-view a real world space 3 which may be for example a concert hall or other music venue. The CRS 15 is applicable to any real world space, however. A VR capture device 6 for video and spatial audio capture may be supported on a floor 5 of the space 3 in front of multiple audio sources 7, 8, in this case two musicians and associated instruments; the position of the VR capture device 6 is known, e.g. through predetermined positional data or signals derived from a positioning tag on the VR capture device 6. The VR capture device 6 in this example may comprise a microphone array configured to provide spatial audio capture.

As well as having an associated microphone or audio feed, the audio sources 7, 8 may carry a positioning tag. A positioning tag may be any module capable of indicating through data its respective spatial position to the CRS 15. For example the positioning tag may be a high accuracy indoor positioning (HAIP) tag which works in association with one or more HAIP locators 20 within the space 3. HAIP systems use Bluetooth Low Energy (BLE) communication between the tags and the one or more locators 20. For example, there may be four HAIP locators mounted on, or placed relative to, the VR capture device 6. A respective HAIP locator may be to the front, left, back and right of the VR capture device 6. Each tag sends BLE signals from which the HAIP locators derive the tag, and therefore, audio source location.

In general, such direction of arrival (DoA) positioning systems are based on (i) a known location and orientation of the or each locator, and (ii) measurement of the DoA angle of the signal from the respective tag towards the locators in the locators' local co-ordinate system. Based on the location and angle information from one or more locators, the position of the tag may be calculated using geometry.

The CRS 15 is a processing system having an associated user interface (UI) 16 which will be explained in further detail below. As shown in FIG. 1, the CRS 15 receives as input from the VR capture device 6 spatial audio and video data, and positioning data, through a signal line 17.

Alternatively, the positioning data may be received from the HAIP locator 20. The CRS 15 also receives as input from each of the audio sources 7, 8 audio data and positioning data from the respective positioning tags, or the HAIP locator 20, through separate signal lines 18. The CRS 15 generates spatial audio data for output to a user device 19, such as a VR headset with video and audio output.

The input audio data may be multichannel audio in loudspeaker format, e.g. stereo signals, 4.0 signals, 5.1 signals, Dolby Atmos® signals or the like. Instead of loudspeaker format audio, the input may be in the multi microphone signal format, such as the raw eight signal input from the Nokia OZO® VR camera, if used for the VR capture device 6. The microphone signals can then be rendered to loudspeaker or binaural format for playback.

Figure 2:
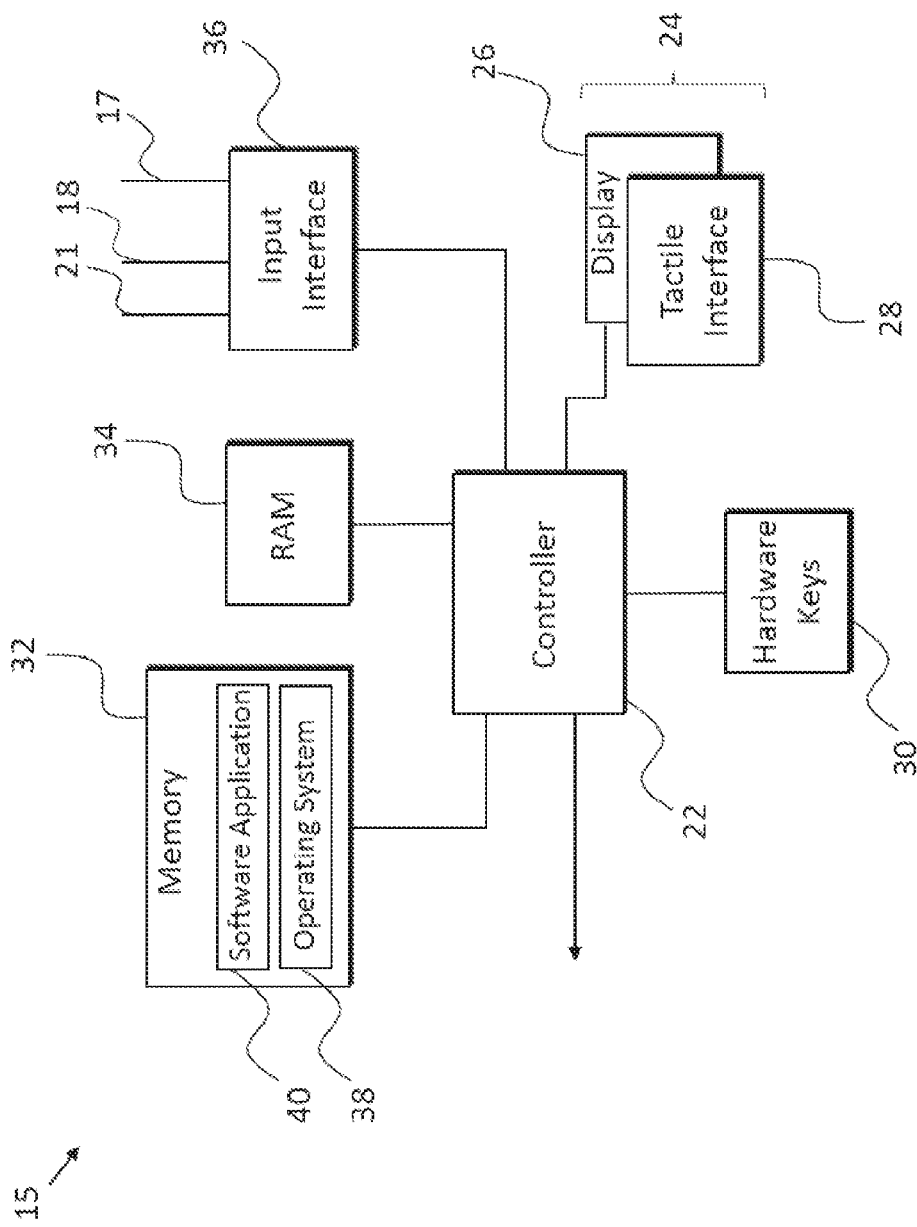
FIG. 2 is a schematic diagram illustrating components of the FIG. 1 rendering apparatus.

FIG. 2 shows an example schematic diagram of components of the CRS 15. The CRS 15 has a controller 22, a touch sensitive display 24 comprised of a display part 26 and a tactile interface part 28, hardware keys 30, a memory 32, RAM 34 and another (e.g. wired, serial or parallel) input interface 36. The controller 22 is connected to each of the other components in order to control operation thereof. The touch sensitive display 24 is optional, and as an alternative a non-touch display may be used with the hardware keys 30 and/or a mouse peripheral used to control the CRS 15 by suitable means. The input interface 36 may be a microphone and speech recognition interface, allowing voice control.

The memory 32 may be a non-volatile memory such as read only memory (ROM) a hard disk drive (HDD) or a solid state drive (SSD). The memory 32 stores, amongst other things, an operating system 38 and software applications 40. The RAM 34 is used by the controller 22 for the temporary storage of data. The operating system 38 may contain code which, when executed by the controller 22 in conjunction with RAM 34, controls operation of each of the hardware components of the terminal.

The controller 22 may take any suitable form. For instance, it may be a microcontroller, plural microcontrollers, a processor, or plural processors. The controller includes circuitry.

In embodiments herein, the software application 40 is configured to provide video and distributed spatial audio capture, mixing and rendering to generate a VR environment, or virtual space, including the rendered spatial audio. In some embodiments, only spatial audio may be provided without the need for video.

The software application 40 also provides the UI 16, through its output to the display 24 and receives user input through the tactile interface 28 or other input peripherals such as the hardware keys 30 or a mouse (not shown). Other embodiments may include a hand gesture input device for identifying hand movements for controlling the UI 16. Here, the tactile interface 28 is not necessary. The hand gesture input device may for example include a glove having a number of sensors to detect movement of the hand, or an array of cameras for identifying and tracking a user's hand. One or more mixing controls may alternatively, or additionally, be provided as the input peripherals. For example, a rotatable knob may be associated with each audio source for controlling some aspect of the audio generated by that audio source. The mixing step of generating a VR environment may be performed manually through the UI 16, through one or more other input peripherals, or all or part of said mixing step may be performed automatically. The software application 40 may render the virtual space, including the spatial audio, using known signal processing techniques and algorithms based on the mixing step.

The input interface 36 receives video and audio content data from the capture device 6. The capture device 6 may be a VR capture device such as Nokia's OZO® device. The input interface 36 also receives audio content data from each of the audio sources 7, 8. The input interface 36 further receives the positioning data from (or derived from) the positioning tags on each of the VR capture device 6 and the audio sources 7, 8. From the positioning data may be made an accurate determination of the positions of the related components in the real world space 3.

The software application 40 may be configured to operate in any of real-time (i.e. 'live'), near real-time or even offline using pre-stored captured data.

The software application 40 is arranged to be operated to avoid or at least mitigate issues of unwanted audio masking when the rendered data is being consumed by a user. In this context, audio masking is the perceived effect of sounds from two or more audio sources overlapping. If a user is positioned in the virtual world at a location where there is spatial audio overlap, then one louder sound may interfere with, or block, a quieter sound. The rendered output may not create the desired perceived audio scene for the listener.

Each audio source 7,8 emitting a sound has an associated spatial audio field. The skilled person's common general knowledge includes the teaching of Pihlajamaki T., Santala O., & Pulkki V "Synthesis of Spatially Extended Virtual Sources with Time-Frequency Decomposition of Mono Signals", J. Audio Eng. Soc., Vol. 62, No. 7/8, 2014. Here, it is explained how to create spatial audio fields. In one example, the method divides a sound into frequency bands using short-time Fourier transform (STFT) and then spatially distributes the frequency components to N discrete spatial locations around the desired spatial spread (for example, 90 degrees).

The spatial audio field is the two or three-dimensional space over which the audio source's 7,8 audio signals propagate at a given time. For ease of explanation, we will illustrate operation with respect to two-dimensional audio fields in top-plan view.

An audio field for a given audio source may change over time. For example, the audio field may move in correspondence with an audio source moving. If a musical artist is walking across a stage, and passes in front of another artist, then their respective audio fields will move in correspondence and may overlap with respect to a consuming user's position in the virtual space.

Additionally, or alternatively, a mixing operator may manually move or pan the audio field to suit a particular application or user experience.

Additionally, or alternatively, an audio field may be enlarged without the audio source necessarily moving. This may occur if the volume of the audio source increases. Additionally, or alternatively, mixing operator may widen the audio field to suit a particular application or user experience.

These examples may be collectively termed as audio field movement in this context because there is a spatial change from a current state. The movement may be caused by user input and/or through automatic adjustment. The following examples focus on movement due to user input, but automatic adjustment may result from the sound source nearing the VR capture device 6 and/or an algorithm whereby if the amplitude of an audio source exceeds a threshold, it is then made wider rather than louder.

Figure 3B:
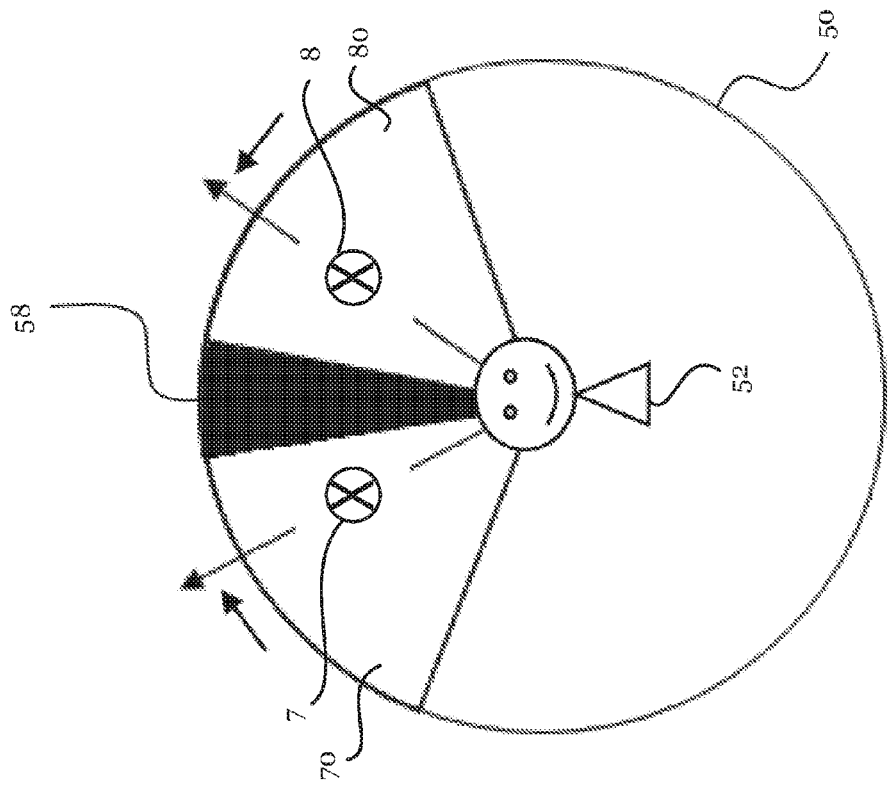
FIGS. 3a and 3b are plan views showing spatial audio fields according to embodiments.
Figure 3A:
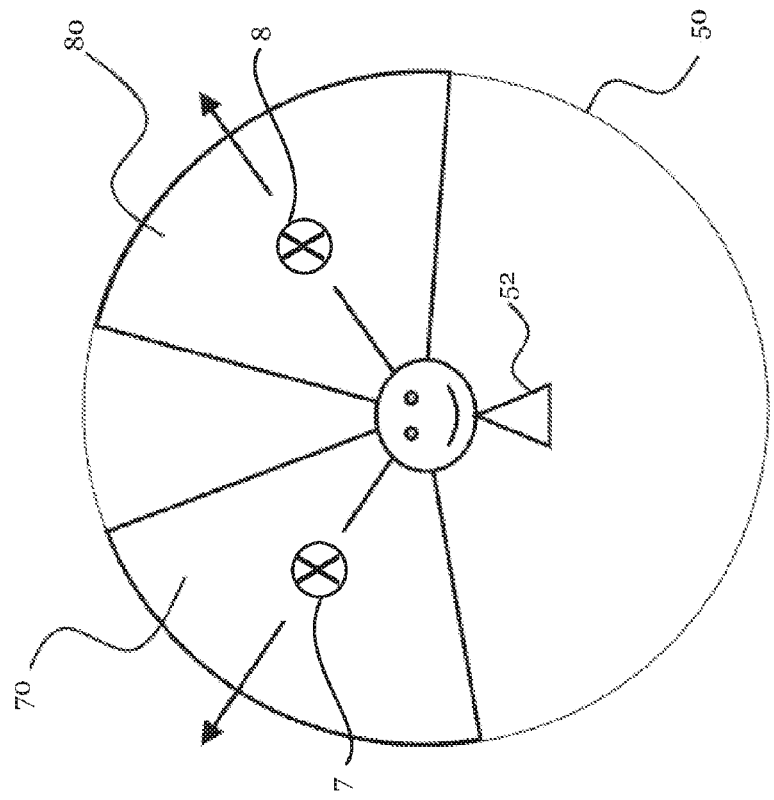

Referring to FIGS. 3a and 3b, a potential masking scenario is represented. A two-dimensional spatial area 50 indicates the overall audio field around a user's current position 52. Referring to FIG. 3a, two audio sources 7, 8 are positioned with respective azimuth angles of approximately 30° and −30° to produce respective audio fields 70, 80 which indicate the direction of audio signal propagation and which do not overlap. If the audio fields 70, 80 are panned (rotated) relative to one another, as shown in FIG. 3b, overlap may occur resulting in an interference or masking zone 58 which may produce unwanted effects.

The software application 40 operates to alert the user to overlapping spatial audio fields. Alerting may occur by changing the displayed representation of the audio fields, but it may instead occur haptically, aurally or through a different visually perceivable indicator, or through some combination thereof. Any aural alert is separate from masking or distortion etc. that ordinarily results from overlapping spatial audio fields. Advantageously, the alert identifies the overlap between the spatial audio fields. Once the user is alerted to the overlap, they can decide what remedial action to take.

The software application 40 may be controlled by the user through the user interface 16 to remove (or at minimum significantly reduce) any overlapping zones and therefore avoid or mitigate masking.

The word "zone" may refer to any definable area of two- or three-dimensional space. The manner in which the modification is performed may take various forms, and some specific examples will be described with reference to FIGS. 6a to 10.

Generally speaking, the software application stores mapping between user inputs and spatial audio field changes. In response to detecting a user input, the software application responds by performing the corresponding changing of one or more of the associated spatial audio fields.

The changing of the spatial audio fields may involve reducing a size of one or both of the overlapping spatial audio fields, for instance such that the spatial audio fields become contiguous or separated by a relatively small gap. The changing of the spatial audio fields may involve placing the first spatial audio field and the second spatial audio field adjacent to one another in a horizontal direction. The changing of the spatial audio fields may involve moving one or both of the first spatial audio field and the second spatial audio field in a vertical direction, to provide complete or partial separation between them. If one of the audio sources 7, 8 is much quieter than the other one of the audio sources 7, 8 and they lie in the same direction from the perspective of the user, the quieter audio source 7, 8 may not be heard at all if their respective spatial audio fields 70, 80 overlap. Generally, separating the sounds spatially helps the listener hear both sounds more clearly.

The changing of the spatial audio fields may involve splitting one spatial audio field into two portions and placing them either side of the other spatial audio field.

In addition to or alternatively to moving or splitting one or plural spatial audio fields, one or both may be re-sized. Re-sizing by reducing size allows overlapping to be avoided or reduced without altering the position of the spatial audio field as much as would otherwise be required.

The changing of the spatial audio fields may involve moving or re-sizing the first spatial audio field but not the second spatial audio field. Thus, priority of a dominant spatial audio field (such as one relating to a lead singer or lead musician) can be preserved in the mixed audio.

Figure 5:
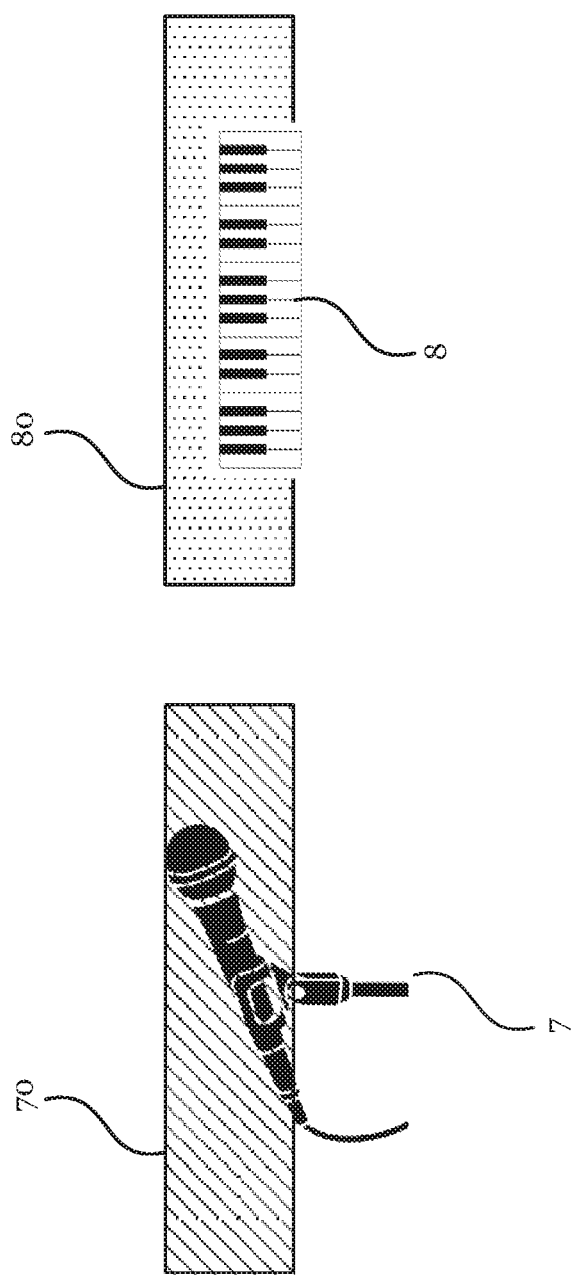
FIG. 5 shows audio sources and their respective spatial audio fields according to embodiments.

FIG. 5 shows examples of spatial audio fields 70, 80 from another perspective. Here, the perspective is of the user standing at the position of the VR capture device 6. The view is towards two audio sources 7, 8. The first audio source 7 is a microphone. The second audio source is a keyboard 8. Each audio source 7, 8 has a respective spatial audio field 70, 80 associated with it. The spatial audio fields 70, 80 are shown as being rectangles. This should not be considered limiting. The spatial audio fields 70, 80 may be any shape of polygon, such as a triangles or ellipses. Each of the spatial audio fields 70, 80 may have different types of shapes. For example, the first spatial audio field 70 may be an ellipse, while the second spatial audio field may be a square.

The first spatial audio field 70 and the second spatial audio field 80 are shown here as being equal in length and width. However, the size of the spatial audio fields 70, 80 varies according to volume and/or distance from the VR capture device 6 and/or spatial extent of the audio source 7, 8 and/or the mixing operator's (i.e. the user's) perspective to the audio source in virtual reality.

Figure 4:
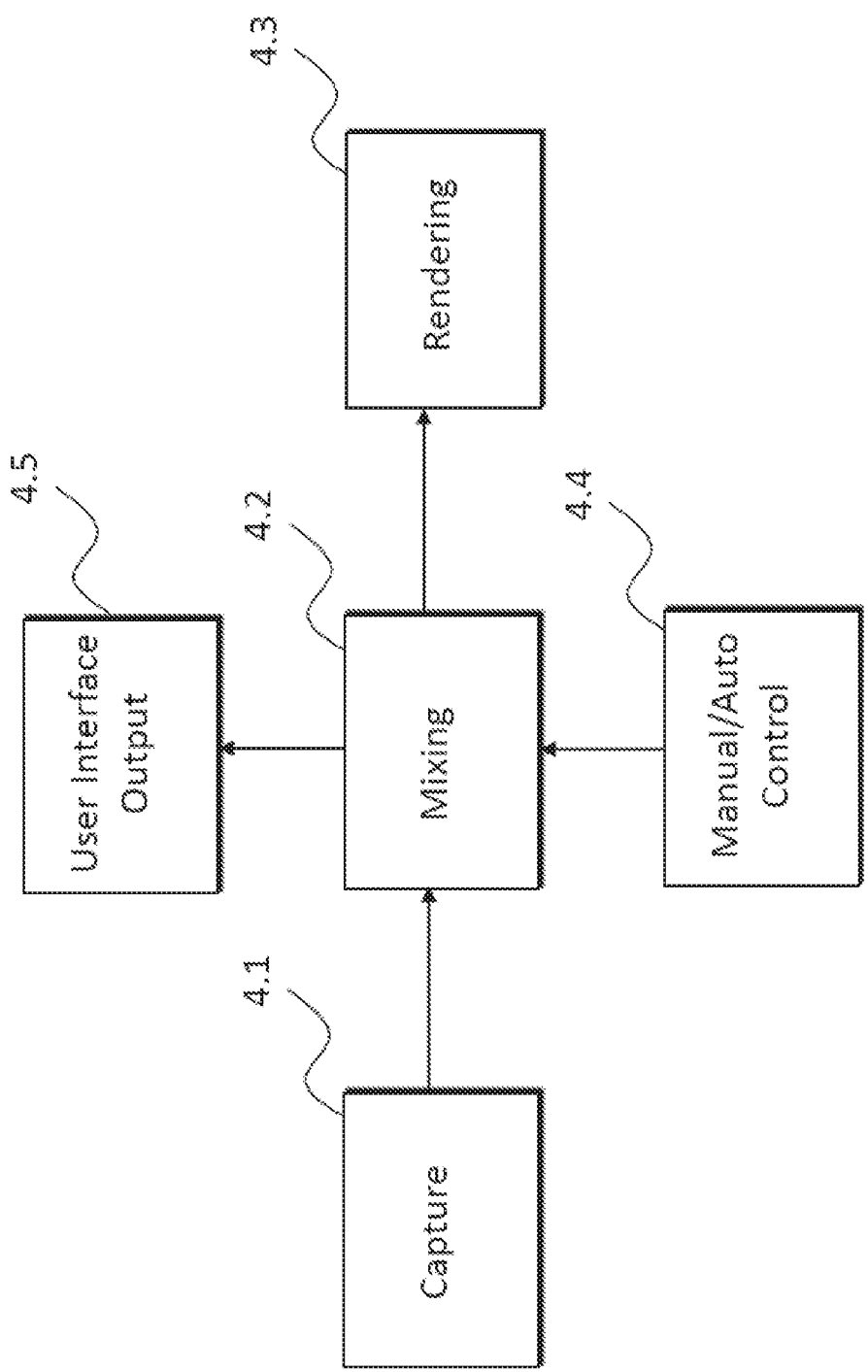
FIG. 4 is a flow diagram showing method steps of audio capture, mixing and rendering according to embodiments.

FIG. 4 shows an overview flow diagram of the capture, mixing and rendering stages of software application 40. The mixing and rendering stages may be combined. First, video and audio capture is performed in step 4.1. Next mixing is performed in step 4.2. This is followed by rendering in step 4.3. Mixing (step 4.2) may be dependent on a manual or automatic control step 4.4. Automatic control may be based on attributes of the captured video and/or audio.

In the embodiments described below, it is assumed that manual control is used to move and/or adjust one or more spatial audio fields, either through the touch sensitive display 24 or using one or more mixing controls. Other attributes may be used.

Step 4.5 indicates the user interface output which provides real- or near-real time visual feedback of the mixed output which will result from the commanded movement based on the operation of the software application 40.

When an overlap incident occurs, the software application 40 is configured to alert the user. For example, the software application 40 causes the overlapping area to flash.

Advantageously, the embodiments described herein enable interactions in virtual reality on top of images of the sound sources 7, 8 to correct their masking issues. It may be said that the interactions are performed 'live', rather than the spatial audio fields being preconfigured.

Examples of how the mixing step 4.2 may be performed by the software application 40 will now be described with reference to FIGS. 6a to 10.

In the example shown in FIG. 6a, the first spatial audio field 70 and the second spatial audio field 80 partially overlap in an overlapping region 58. The second spatial audio field 80 is shown as being slightly elevated above the first spatial audio field 70, but this is merely to exemplify the overlapped region and make it clear that the second spatial audio field 80 is disposed behind the first spatial audio field 70. In other words, as with the Figures that follow, the first spatial audio field 70 is to be considered the front (or dominant) spatial audio field, and the second spatial audio field 80 is to be considered the rear (not dominant) spatial audio field.

The overlapping region 58 is caused to be represented differently to non-overlapping regions. For instance, the overlapping region 58 may be caused to flash (alternate between different brightnesses) or change in colour. This allows the user to identify the full horizontal extent of the second spatial audio field 80.

A user interaction, or gesture, is indicated by the arrow. The user gesture is a user interaction with the touch sensitive display 24. Alternatively, the user gesture may be a user interaction with a mouse or other input device. For example, the user gesture may be a voice command received through a microphone. Alternatively again, the user gesture may be an interaction in the virtual reality environment. For example, instead of swiping or tapping on the touch sensitive display 24, the user may swipe or tap virtual reality objects in free space. For example the user gesture may be a non-touch hand gesture, like a swipe gesture.

In FIG. 6a, the user gesture is a swipe gesture. The start of the swipe gesture is at a position in the representation of the overlapped region 58 and the movement of the gesture is in a downwards direction. As shown in FIG. 6b, the effect of the swipe gesture is to eliminate the overlapped region 58 by assigning half of the overlapped region 58 to the first spatial audio field and the other half of the overlapped area to the second spatial audio field 80. In effect, each of the first spatial audio field 70 and second spatial audio field 80 are reduced in horizontal extent (or length) by an amount equal to half of the horizontal extent (or length) of the overlapped region 58. The resulting first and second spatial audio fields 70, 80 may not be equal in length, although the overlapped region is equally divided between them. In other words, each of the first and second spatial audio fields are cropped, or cut, such that both of the audio sources 7, 8 can be heard when facing in a direction in which they overlap. The reduced first and second spatial audio regions are substantially horizontally adjacent each other.

In particular, the CRS 15 responds to the received user gesture by cropping each of the first and second spatial audio fields 70, 80. The CRS 15 crops the adjacent ends of the spatial audio fields 70, 80 equally to remove the overlapping region 58. This way it may be easier for the user to focus on the sounds generated by either of the audio sources 7, 8 and hear them at different spatial locations. Sounds at horizontally separate locations are easier to perceive than sounds at vertically separate locations.

Figure 7A:
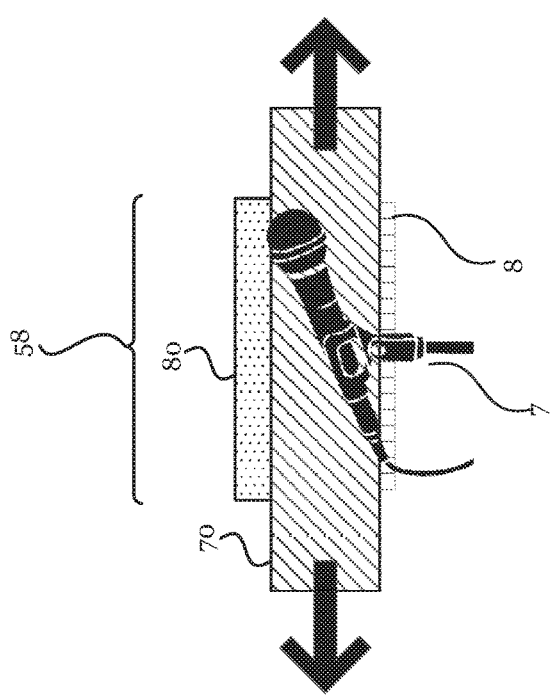
FIGS. 7a and 7b are system diagrams showing how fully overlapping spatial audio fields are separated according to embodiments.

FIG. 7a illustrates another method of separating two overlapping spatial audio fields 70, 80. Here, the first spatial audio field 70 fully overlaps the second spatial audio field 80, such that little or no sound would be heard from the second audio source 80. The overlapped region 58 is the same length as the second spatial audio field 80. As no part of the second spatial audio field 80 visible to the user from this perspective, the user is made aware of the overlap by the overlapping region 58 flashing, or changing in colour.

In FIG. 7a, the user gesture is a swipe-to-cut interaction. The gesture comprises two components: a first component includes leftward movement and a second component includes a rightward movement. Each component starts at a location on the representation of the first spatial audio field 70, and in particular at opposite ends thereof. Essentially, the user swipes both ends of the first spatial audio field 70 to pull the first spatial audio field 70 apart.

Figure 7B:
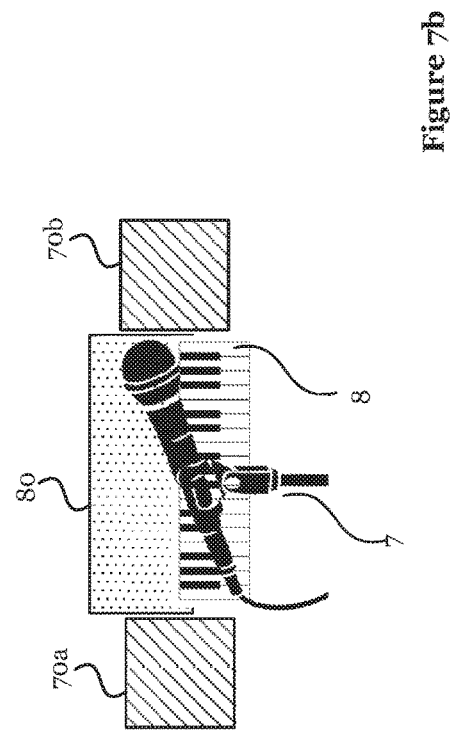

As shown in FIG. 7b, the effect of the swipe-to-cut interaction is to create a gap in the first spatial audio field 70 through which the second audio source 8 can be heard. The first spatial audio field 70 is divided into two parts 70a, 70b. The two parts 70a, 7b are disposed adjacent the second spatial audio field 80 on opposite sides, such that there is no overlapping region.

In particular, the CRS 15 responds to the received user gesture by dividing the first spatial audio field 70 into two separated parts 70a, 70b. The two parts are spatially separated by the full length of the second spatial audio region 80. In other words, the CRS 15 removes the section of the first spatial audio field 70 that overlaps the second spatial audio field 80. Therefore, the second audio source 8 is not distorted by the first audio source 7.

Figure 8A:
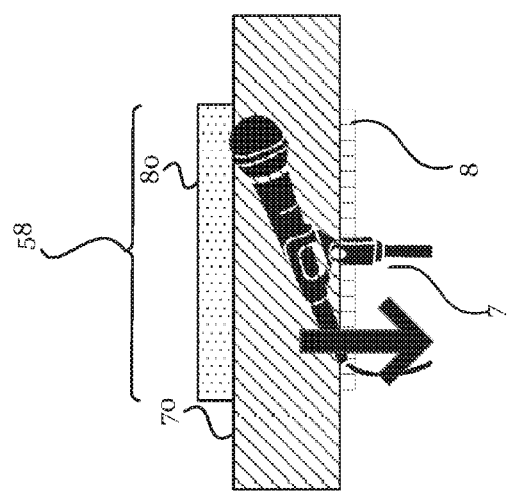
FIGS. 8a and 8b are system diagrams showing how fully overlapping spatial audio fields are separated according to embodiments.

FIG. 8a illustrates another method of separating two overlapping spatial audio fields 70, 80. Here, the first spatial audio field 70 fully overlaps the second spatial audio field 80, such that little or no sound can be heard from the second audio source 80. The overlapped region 58 is the same length as the second spatial audio field 80. The overlapping region 58 is caused to flash, or change in colour. This allows the user to identify the overlap even though no part of the second spatial audio field 80 visible to the user from this perspective.

In FIG. 8a, the user gesture is a swipe-to-gut interaction. Essentially, the user swipes a hole in the first spatial audio field 70. This is achieved by a gesture starting at the top part of the first spatial audio field 70 and moving from the top to the bottom of the first spatial audio field 70. The gesture may involve one or two fingers.

Figure 8B:
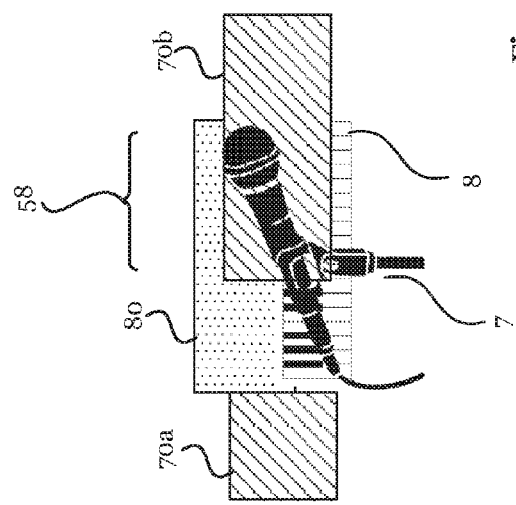

As shown in FIG. 8b, the effect of the user gesture is to split the first spatial audio field 70 into a first part 70a and a second part 70b. The first part 70a is disposed adjacent one side of the second audio field 80, while the second part 70b is arranged to overlap part of the second audio field at the end of the second spatial audio region 80 that is opposite the first part 70a of the first spatial audio region 70.

Thus, the second sound source 8, disposed behind the first sound source 7, can be heard clearly when facing the arrangement from an angle where the first and second sound sources 7, 8 overlap.

In particular, the CRS 15 responds to the received user gesture by removing a part of the first spatial audio field 70 at the overlapping region 58. This reveals part of the second spatial audio field 80. While there is still an overlapping region 58, there is also a zone where the second audio source 8 can be heard without interference from the first audio source 7, and a zone where there first audio source 7 can be heard without interference from the second audio source 8.

FIG. 9a shows another example of an overlapping region 58. Here, the first spatial audio field 70 partially overlaps the second spatial audio field 80. The second spatial audio field 80 is fully overlapped in the horizontal direction, but is caused to be displayed extending from behind the first spatial audio field 70 in the vertical direction.

FIG. 9a shows the user gesture being a hold-and-move interaction. The user is able to touch part of the second spatial audio field 80 and move it above or below the first spatial audio field 70, such that there is no longer an overlapping region. The effect is shown in FIG. 9b. This allows both audio sources 7, 8 to be heard when facing in the shown perspective, although the second audio source 8 is be perceived to be at a different height than the first audio source 7.

Responsive to it being determined that the first spatial audio field 70 overlaps the second spatial audio field 80, the CRS 15 may be configured to overlay a representation of the second spatial audio field 80 on the first spatial audio field 70. For example, the overlaid representation may be given a dotted perimeter line to indicate that the first spatial audio field 70 is actually in front of the second spatial audio field 80. Without this representation, the second spatial audio field 80 would be completely masked such that the user could not interact with it.

The hold-and-move gesture shown in FIG. 9a may involve the user double tapping, or touching and holding, the representation of the second spatial audio field 80 in order to move it. Alternatively, where part of the second spatial audio field 80 is visible to the user, the user is able to interact directly with the second spatial audio field 80 rather than a representation thereof.

While the examples shown in FIGS. 6a to 9b indicate the user gestures being swipe actions in the vertical or horizontal directions, it would be readily apparent that the spatial audio fields 70, 80 occur in three-dimensional space, and therefore a gesture from any direction could be used to remove the overlapped region 58. For example, in the case of FIGS. 7a and 7b, the swipe-to-cut interaction could be a vertical swipe, such that the first spatial audio field 70 is split into two parts 70a, 70b arranged on the top and bottom sides of the second spatial audio field 80. In further examples, the first and second spatial audio fields 70, 80 are spatially separated by an increase in depth, rather than a horizontal or vertical displacement.

Figure 10:
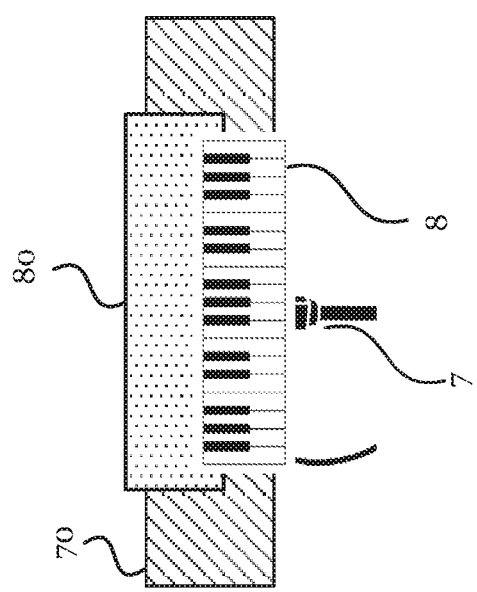
FIG. 10 is a system diagram showing how fully overlapping spatial audio fields are controlled according to embodiments.

FIG. 10 illustrates another method of handling overlapping spatial audio fields. Here, the positions of sound sources 7, 8 are reversed in response to a user input. In other words, the audio source 8 at the rear of the first audio source 7 is moved to the front, and vice versa. Therefore, the audio source that in the real environment is to the rear now masks the audio source that in the real environment is to the front. The spatial order of the audio sources 7, 8 may be changed for example by the user tapping on one of the first and second spatial audio fields 70, 80. By moving the rearmost audio source to the front, the audio source is no longer overlapped. In the case of the audio source that was at the front being larger (e.g. wider), the change results in both audio sources being present, whereas before the change one was wholly or largely masked.

Visually, this re-ordering is implemented by obtaining video images from multiple cameras and extracting image data for the audio sources 7, 8, such as performers. The audio source 7 originally at the front of another audio source 8 but moved to the back may be made semi-transparent in the rendered environment.

Where the second spatial audio field 80 is disposed behind the first spatial audio field 70, at least part of the second spatial audio field 80 may be deleted from the overlapping region 58. Therefore, instead of a hole being made in the first spatial audio field 70 as described above, the overlapping region 58 may be removed by deleting the overlapped part of the second spatial audio field 80. This can effectively eliminate any impact on the first audio source 7 of sound generated by the second audio source 8. Where the second spatial audio field 80 is spatially wider than the first spatial audio field 70, the second audio source 8 can still be heard in the non-overlapping region. In other words, the remaining parts of the second spatial audio field 80 are arranged adjacent to opposite ends of the first spatial audio field 70.

The choice of means for separating first and second spatial audio fields 70 will be determined by the mixing operator depending on sound types and desired artistic effect present in the scene or required. For example, the example shown in FIGS. 7a and 7b where one spatial audio field is split into two portions might be preferential for a scene containing a naturally wide sound (such as a drum set or keyboards), and a lead instrument which would naturally sound good as a narrow source (such as vocals).

Figure 11:
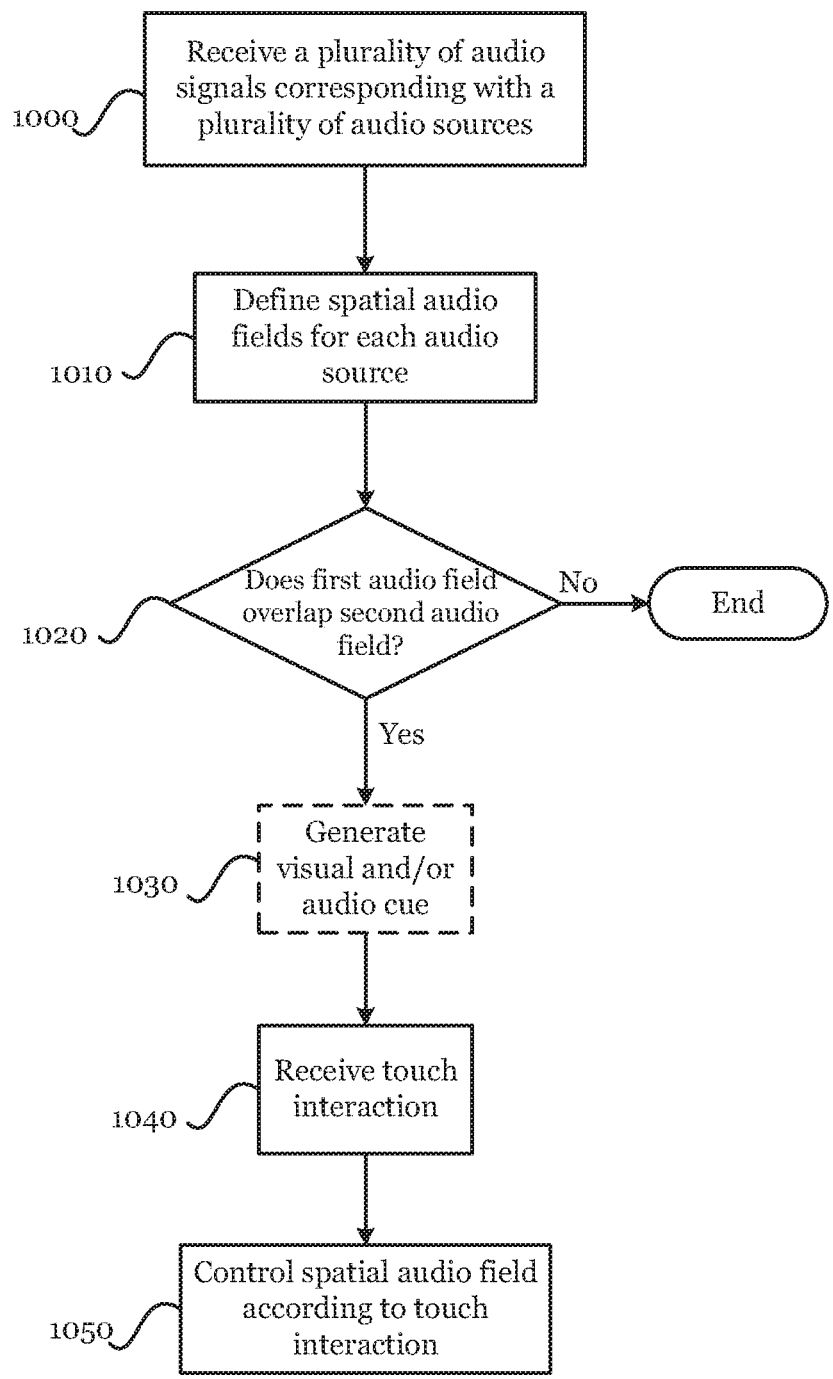
FIG. 11 is a flow diagram showing a method of handling masked audio sources according to embodiments.

A method of handling audio mixing will now be described with reference to FIG. 11.

In a first step 1000, a plurality of audio signals corresponding with a plurality of audio sources 7, 8 are received. The audio signals may be received from a VR capture device 6 or from microphones or other audio capture devices associated directly with the audio sources 7, 8. The audio sources 7, 8 are for example singers or musicians and their associated microphones and instruments.

In step 1010, the CRS 15 defines spatial audio fields 70, 80 for each audio source 7, 8. The spatial extent and position of the spatial audio fields 70, 80 are determined by at least the position of the respective audio sources 7, 8, by the mixing operator's (i.e. the user's) perspective to the audio source in virtual reality and by the spatial extent of the audio source 7, 8. The positions of the audio sources 7, 8 are determined in any suitable way, for example using HAIP tags.

In step 1020 the CRS 15 determines whether one spatial audio field at least partially overlaps another spatial audio field from the mixing operator's perspective. If there is no overlap, then the process of handling audio masking ends, and the process of rendering the virtual reality environment continues.

If one of the spatial audio fields overlaps another spatial audio field, in an optional step 1030 a cue is generated to make the mixing operator aware of the overlapping region 58. This may be advantageous when the mixing operator is unable to see one of the spatial audio fields, or is not aware of their full extent. The cue may be an audio or visual cue, or both. For example, the CRS 15 may cause the overlapping region 58 to flash (alternate in brightness and/or colour). Furthermore, the flashing overlapping region 58 may be made set such that the user interact with the covered part of the spatial audio field, as opposed to the foreground spatial audio field.

In step 1040, the CRS 15 receives a touch interaction (such as a user gesture) through the touch sensitive display 24. The touch interaction may be any one of those described previously with reference to FIGS. 6a to 10. Alternatively, the touch interaction may be another form of user gesture, such as a manipulation of a mouse or a voice command received through a microphone.

In step 1050, one of the overlapping or overlapped spatial audio regions 70, 80 is controlled according to the touch interaction. This may include one of cropping, deleting, moving and reordering the controlled spatial audio region 70, 80.

It will be appreciated that the above described embodiments are purely illustrative and are not limiting. Other variations and modifications will be apparent to persons skilled in the art upon reading the present application and various variations and modifications are intended to be within the scope of the appended claims.

Moreover, the disclosure of the present application should be understood to include any novel features or any novel combination of features either explicitly or implicitly disclosed herein or any generalization thereof and during the prosecution of the present application or of any application derived therefrom, new claims may be formulated to cover any such features and/or combination of such features.

The invention claimed is:

1. A method comprising:
receiving, by an apparatus, at least first and second audio signals representing audio respectively from first and second audio sources in a space;
defining, for the first and second audio sources, first and second spatial audio fields, respectively, each being indicative of a propagation of the respective audio signals within the space;
detecting, by the apparatus, at least partial overlapping of the first spatial audio field with the second spatial audio field in an overlap region;
causing, by the apparatus, an indication of the at least partial overlapping to a user; and
responding, by the apparatus, to a user input by at least splitting the first spatial audio field into two portions and placing each portion on either side of the second spatial audio field.

2. The method according to claim 1, further comprising:
responding, by the apparatus, to the user input by at least reducing a size of the second spatial audio field.

3. The method according to claim 1, further comprising:
responding, by the apparatus, to the user input by at least moving the second spatial audio field in a horizontal direction.

4. The method according claim 1, further comprising:
responding, by the apparatus, to the user input by at least moving the second spatial audio field in a vertical direction.

5. The method according to claim 1, further comprising:
causing, by the apparatus, the indication of the at least partial overlapping to a user by at least changing a visual representation of the overlap region.

6. An apparatus comprising:
at least one processor and at least one memory having computer-readable instructions stored thereon, the computer-readable instructions when executed by the at least one processor causing the apparatus to at least:
receive at least first and second audio signals representing audio respectively from first and second audio sources in a space;
define, for the first and second audio sources, first and second spatial audio fields, respectively, each being indicative of a propagation of the respective audio signals within the space;
detect at least partial overlapping of the first spatial audio field with the second spatial audio field in an overlap region;
cause an indication of the at least partial overlapping to a user; and
respond to a user input by at least splitting the first spatial audio field into two portions and placing each portion on either side of the second spatial audio field.

7. The apparatus according to claim 6, wherein
the computer-readable instructions when executed by the at least one processor further cause the apparatus to at least:
reduce a size of the second spatial audio field.

8. The apparatus according to claim 6, wherein
the computer-readable instructions when executed by the at least one processor further cause the apparatus to at least:
respond to the user input by at least moving the second spatial audio field in a horizontal direction.

9. The apparatus according to claim 6, wherein
the computer-readable instructions when executed by the at least one processor further cause the apparatus to at least:
respond to the user input by at least moving the second spatial audio field in a vertical direction.

10. The apparatus according to claim 6, wherein
the computer-readable instructions when executed by the at least one processor further cause the apparatus to at least:
cause the indication of the at least partial overlapping to a user by at least changing a visual representation of the overlap region.

11. A non-transitory computer-readable medium having computer-readable code stored thereon, the computer-readable code, when executed by at least one processor, cause performance of:
receiving at least first and second audio signals representing audio respectively from first and second audio sources in a space;
defining, for the first and second audio sources, first and second spatial audio fields, respectively, each being indicative of a propagation of the respective audio signals within the space;
detecting at least partial overlapping of the first spatial audio field with the second spatial audio field in an overlap region;
causing an indication of the at least partial overlapping to a user; and
responding to a user input by at least splitting the first spatial audio field into two portions and placing each portion on either side of the second spatial audio field.

* * * * *